(12) United States Patent
Mendez et al.

(10) Patent No.: US 11,838,758 B2
(45) Date of Patent: Dec. 5, 2023

(54) SYSTEMS AND METHODS FOR PERSONALIZED IMAGE INDICATOR PROVIDING RESOURCE VERIFICATION

(71) Applicant: Verizon Patent and Licensing Inc., Basking Ridge, NJ (US)

(72) Inventors: Bruno Mendez, Springfield, NJ (US); Manuel Enrique Caceres, Basking Ridge, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 17/480,261

(22) Filed: Sep. 21, 2021

(65) Prior Publication Data
US 2022/0007189 A1    Jan. 6, 2022

Related U.S. Application Data

(63) Continuation of application No. 16/455,712, filed on Jun. 27, 2019, now Pat. No. 11,153,756.

(51) Int. Cl.
*H04L 9/32*  (2006.01)
*H04W 12/08*  (2021.01)
*H04L 9/08*  (2006.01)
*H04L 9/14*  (2006.01)
*H04L 9/30*  (2006.01)

(52) U.S. Cl.
CPC .......... *H04W 12/08* (2013.01); *H04L 9/0866* (2013.01); *H04L 9/14* (2013.01); *H04L 9/30* (2013.01)

(58) Field of Classification Search
CPC ............ H04L 9/30; H04L 9/14; H04L 9/0866
USPC ...................................................... 713/171
See application file for complete search history.

(56) References Cited

U.S. PATENT DOCUMENTS

| | | | |
|---|---|---|---|
| 7,314,167 B1 | 1/2008 | Kiliccote | |
| 8,256,664 B1 | 9/2012 | Balfanz et al. | |
| 2017/0351771 A1* | 12/2017 | Gallenbacher | G06F 16/9535 |
| 2018/0159847 A1 | 6/2018 | Dorfman et al. | |
| 2018/0198612 A1* | 7/2018 | Mullins | G06F 21/6218 |
| 2019/0121997 A1* | 4/2019 | Levin | H04L 63/101 |

* cited by examiner

*Primary Examiner* — Jeffrey C Pwu
*Assistant Examiner* — Samuel Ambaye

(57) ABSTRACT

A system described herein may use automated techniques to verify network connection integrity and provide visual indicators of connection validity or invalidity. The system may generate a unique identifier related to a user and/or web resource during an initial use. The unique identifier may be utilized to transform a secure image and store the transformed image. Upon subsequent use of the web resource, a visit identifier may be generated and utilized to perform an inverse transformation of the transformed image and display the result, where the resulting image will be the same as the secure image if the visit identifier matches the unique identifier.

20 Claims, 10 Drawing Sheets ns for an example embodiment

SYSTEMS AND METHODS FOR PERSONALIZED IMAGE INDICATOR PROVIDING RESOURCE VERIFICATION

CROSS-REFERENCE TO RELATED APPLICATION

This application is a Continuation of U.S. patent application Ser. No. 16/455,712, flied on Jun. 27, 2019, titled "SYSTEMS AND METHODS FOR PERSONALIZED IMAGE INDICATOR PROVIDING RESOURCE VERIFICATION," the contents of which are herein incorporated by reference in their entirety.

BACKGROUND

Many users access various web-based resources, such as web sites, web-based applications, etc., using secure connections. These secure connections may be compromised by intermediaries unknown to users.

DETAILED DESCRIPTION OF THE PREFERRED EMBODIMENTS

The following detailed description refers to the accompanying drawings. The same reference numbers in different drawings may identify the same or similar elements.

Embodiments described herein may provide a system that utilizes private and public keys to identify and/or indicate the validity and/or security of a network-accessible resource. The keys may be utilized to generate a unique identifier ("ID") associated with a particular user (or user device). The unique ID may be stored and compared to a "visit ID" generated using private and public keys associated with a subsequent visit to the resource. The unique ID may be used to transform an image and the visit ID used to perform an inverse transformation, where the inverse transformed image is provided through a user interface ("UI") in order to indicate whether a connection between a User Equipment ("UE") and the resource is secure. For example, as described below, embodiments described herein may eliminate or reduce the likelihood of a "man-in-the-middle" attack, in which an intermediary entity intercepts and relays communications between the UE and the resource.

Figure 1A:
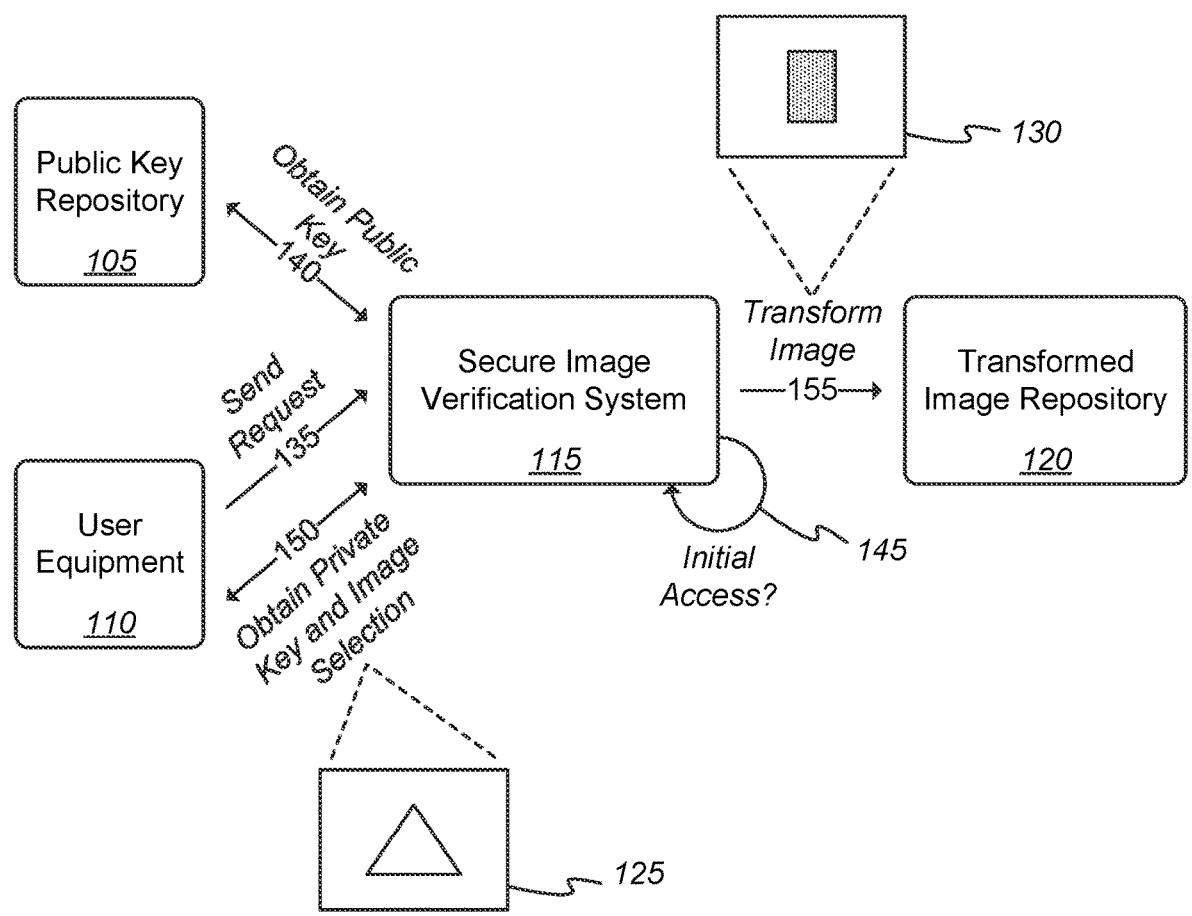
FIGS. 1A, 1B, and 1C illustrate an example embodiment described herein, in which a web resource may be verified, and an indicator may be provided to indicate whether the web resource was verified.

For example, as shown in FIG. 1A, a secure image verification system ("SIVS") may receive (at 135) a request for access to a web-accessible resource. Such a request may be generated based on entry of a web address, selection of a link or application element, etc. The request may be received via an application programming interface ("API"), a plugin component that communicates with a browser, and/or other appropriate resource available to UE 110.

Based on the request, SIVS 115 may obtain (at 140) public key information related to the resource from public key repository 105. The public key information may include one or more stored public keys associated with the requested resource, where such keys may be provided by the requested resource as part of a secure handshake or other verification or authentication process (e.g., transport layer security or "TLS"). In some embodiments, the public key may be, or may include, a certificate that has been issued by a certificate authority ("CA").

SIVS 115 may determine (at 145) that UE 110 has not previously accessed a resource via SIVS 115 (e.g., when no private passkey has been associated with UE 110, when no transformed image has been previously stored, when a previous private passkey has expired, etc.). As discussed below, private passkeys may be used on a per-user or per-UE basis to authenticate and/or identify a particular user or UE. As further discussed below, the private passkeys may be used on a per-resource basis, such that a given UE may be associated with different private passkeys for different resources. Such a determination may be made (at 145) based on information provided by UE 110 with the current request (e.g., a request to generate a new private passkey), information stored in a database or lookup table that correlates users or UEs to private passkeys, and/or other appropriate criteria. Based on determining (at 145) that UE 110 is not associated with a private passkey (and/or is not associated with a private passkey for the requested resource), SIVS 115 may obtain (at 150) a private passkey for the requested resource and an image 125 (or a "secure image") to associate with the resource.

The private passkey may be a password or other seed obtained from UE 110. In some embodiments, the private passkey may be received from a user of UE 110. In some embodiments, the private passkey may be automatically generated in some embodiments, based on, for instance, user account information (e.g., a username or other unique identifier), device information (e.g., a mobile directory number ("MDN") of UE 110, an International Mobile Station Equipment Identity ("IMEI") associated with UE 110, an International Mobile Subscriber Identity ("IMSI") value associated with UE 110, a serial number, and/or other unique identifier), and/or other appropriate and secure information that remains static across visits to a particular resource. In some embodiments, the private passkey may be based on a combination of user input and an identifier associated with UE 110 (e.g., a hashing function performed on (1) a password provided by a user of UE 110 and (2) an IMSI value associated with UE 110). The private passkey may be retained at the UE such that the key is not exposed to any potential malicious actors.

Secure image 125 may be selected and/or generated in various appropriate ways. For instance, a set of available images may be provided to UE 110 for selection by a user, UE 110 may provide an image captured or stored by UE 110, the image may be retrieved from the requested resource, the image may be automatically generated, etc. In this example, the selected secure image 125 that will be used to indicate a secure connection to a user includes a white triangle. Some embodiments may provide alternative notification features than image-based features as described herein. Such alternative features may include, for instance, text-based notifications, other media such as graphics, video clips, audio clips, animations, etc., haptic feedback (e.g., a vibration pattern may indicate a secure connection), and/or may initiate pop-up warnings or similar UI features.

SIVS 115 may transform (at 155) secure image 125 and provide the transformed image 130 to transformed image repository 120. Original secure image 125 is thus not stored or shared across resources. In this example, transformed image 130 includes a colored rectangle. The image may be transformed based on the public key and/or the private passkey. As discussed below with reference to FIGS. 2A and 2B, the image transformation may include various transformation algorithms and parameters.

Figure 1B:
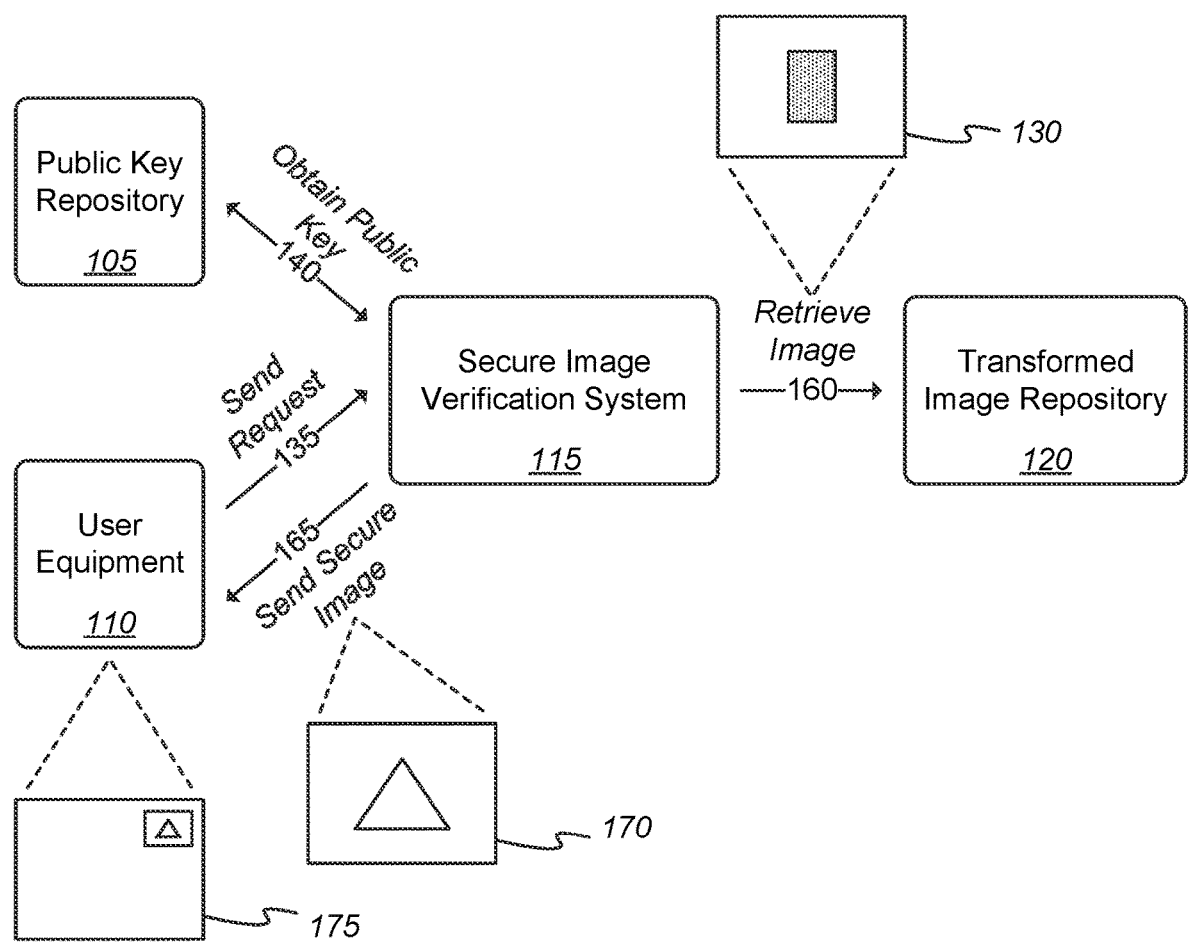

FIG. 1B illustrates an example subsequent resource request, after a secure image has been generated. As similarly discussed above, UE 110 may send (at 135) a resource request to SIVS 115 and the SIVS may obtain (at 140) current public key information related to the resource from the repository 105. In this scenario, the resource request may include a current (or "visit") public key (or one may be retrieved from the requested resource or repository 105) and a current (or "visit") private passkey. The visit private passkey may be received from the UE 110 or automatically generated as described above.

As part of the verification process, some embodiments may determine whether the currently provided public key matches previously stored key information related to the requested resource and generate a notification, warning, or indication if key mismatch is detected.

SIVS 115 may retrieve (at 160) transformed image 130 from transformed image repository 120 and perform an inverse transform to transformed image 130. The inverse transformation may be performed using the visit public key and/or the visit private passkey. In this example, the visit key information and stored key information matches, and thus the inverse transformed image 170 matches original secure image 125. Inverse transformed image (or "indicator") 170 may be sent (at 165) to UE 110, where inverse transformed image 170 is displayed as part of UI 175 (e.g., a browser tab or window, an application interface, etc.). Since inverse transformed image 170 visually matches original secure image 125, a user of UE 110 may be able to quickly and easily determine that the requested resource is secure (e.g., free from a "man-in-the-middle" attack, in which the public key would be different from the previously obtained public key for the resource). Additionally, using an image (i.e., secure image 125) may be easier for a user to perceive and verify than manually evaluating a certificate each time a resource is accessed. In addition, as the image may be selected by a user, the user may be able to choose an image that is easily identifiable to the user as indicating a secure connection, rather than having to interpret an icon or other indicator that may not be as easily identifiable.

Figure 1C:
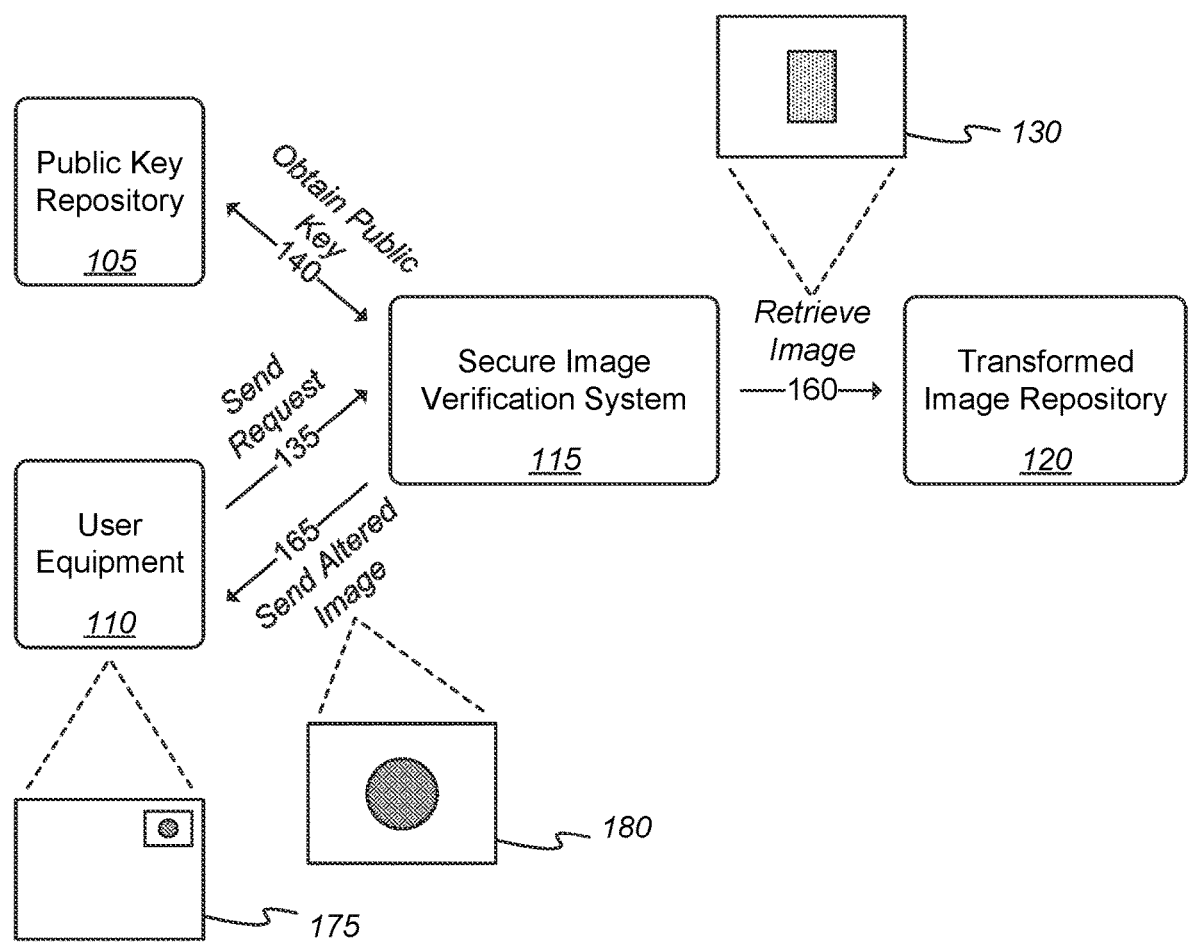

FIG. 1C illustrates an example subsequent resource request, after a secure image has been generated. In this example, there is some mismatch between the visit key information and the stored key information and inverse transformed image 180 does not match original secure image 125, which may indicate a compromised connection (e.g., a "man-in-the-middle" attack). For example, inverse transformed image 180, which is generated based on a public key of the resource after the resource is requested by UE 110, may be visibly different from secure image 125. The inverse transformed image (or "indicator") 180 may be sent (at 165) to UE 110, where it is displayed as part of UI 175. Because inverse transformed image 180 does not visually match original secure image 125, a user of UE 110 may be able to quickly and easily determine that the requested resource is not secure (e.g., potentially subject to a "man-in-the-middle" attack).

Figure 2A:
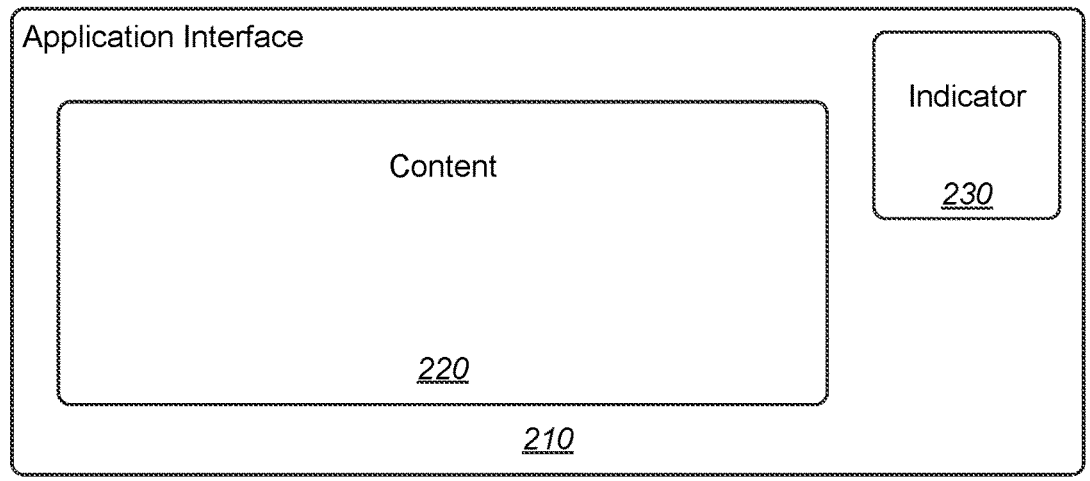
FIGS. 2A and 2B illustrate example user interface ("UI") elements in accordance with one or more embodiments described herein.

FIG. 2A conceptually illustrates a UI 200 as provided by one or more embodiments, described herein. The UI may be similar to UI 175 described above. As shown, UI 200 may include a main window or area 210 (e.g., a browser tab, an application window, etc.) that may include various areas or features 220 associated with content and/or other appropriate components (e.g., navigation elements, sub-components or interfaces, etc.). In addition, UI 200 may include an indicator area 230 which may display an element such as indicator 170 and/or indicator 180 described above.

Figure 2B:
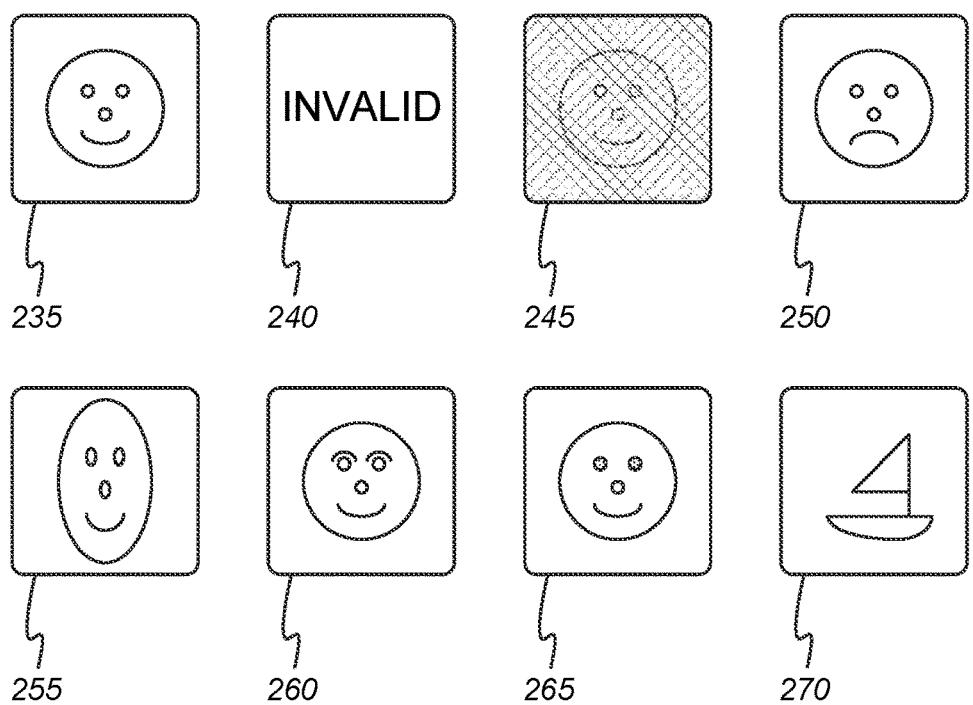

FIG. 2B conceptually illustrates various indicators 235-270 that may be generated and utilized by one or more embodiments described herein. Indicators 235-270 may be utilized with area 230. In this example, indicator 235 may indicate a secure or undisturbed connection and may match an image originally selected by a user (or generated by SIVS 115).

Indicators 240-270 are example indicators that may be provided when the visit ID does not match the previously stored unique ID, and thus the inverse transformation is not complementary to the transformation of a secure image. Indicators 240-270 may be displayed in area 230 of UI 210.

Indicators 240-270 may be representative of various transformations that may be utilized by some embodiments, and the elements 240-270 may be stored as transformed images 130. Each transformation may be associated with a complementary inverse transformation. Some embodiments may encode transformation (and thus inverse transformation) information into a transformed image 130 and/or otherwise store such information and associate the information with a particular UE 110, user, and/or resource. Transformation information may include transformation parameters and/or algorithm selections.

An indicator such as indicator 240 may be automatically generated or retrieved based on a mismatch between a visit ID and a stored unique ID. Indicator 245 may be generated via a transformation that includes filtering original image 235. Such filtering may include various effects, colors, overlays, etc. that may be easily perceived by a user. Indicator 250 may be generated by a transformation that includes a set of feature points or similar elements associated with an original image, where the transformation manipulates some or all of the feature points. In this example, a smiling face has been transformed into a frowning face. Indicator 255 may be generated by a transformation that manipulates the aspect ratio of an original image and may be presented as a stretched face in this example. Indicator 260 may be generated by a transformation that adds or changes features associated with a generated image. In this example, eyebrows have been added to the smiling face. Likewise, features such as the nose or eyes may be removed or relocated. Indicator 265 may be generated by a transformation that changes some features associated with an image. In this example, the eye color has been changed. Finally, indicator 270 may be generated by a transformation that selects an image from among a set of available images. In this example, a smiling face has been replaced by a sailboat. The images may be indexed such that an inverse transformation using matching identifiers results in the originally selected image being displayed.

Although the example indicators described above include simple elements and manipulations, embodiment described herein may allow for selection of intricate or complicated indicator elements and/or transforms. Transformations may be selected and applied with appropriate gain and/or offsets such that mismatch between the unique ID and visit ID results in a displayed image that is clearly different from a selected image.

Figure 3:
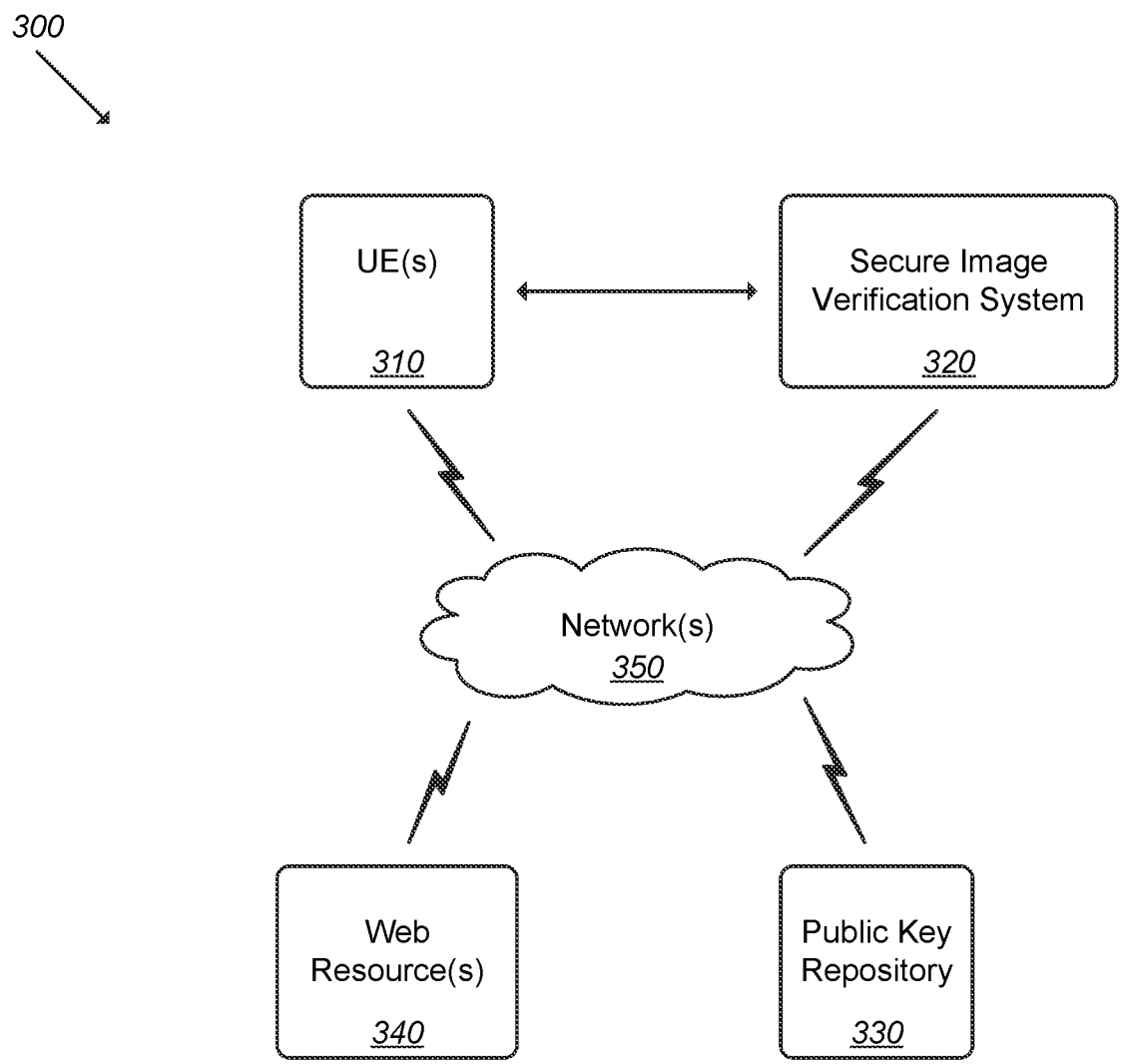
FIG. 3 illustrates an example environment in which one or more embodiments, described herein, may be implemented.

FIG. 3 illustrates an example environment 300 in which one or more embodiments, described herein, may be implemented. As shown, environment 300 may include one or more UEs 310, SIVS 320, public key repository 330, one or more web resources 340, and network 350. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 310 may include any computation and communication device that is capable of communicating with one or more networks (e.g., network 350). For example, UE 310 may include a device that receives content, such as web pages (e.g., that include text content and/or image content), streaming audio and/or video content, and/or other content, via an Internet connection and/or via some other delivery technique. UE 205 may also receive user interactions (e.g., voice input, touches on a touchscreen, "clicks" via an input device such as a mouse, etc.). In some implementations, UE 310 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

SIVS 320 may include one or more devices (e.g., a server device or a distributed set of devices, such as a cloud computing system) that perform one or more actions described herein. In some embodiments, portions of the functionality described below with respect to SIVS 320 may be implemented by UE 310, such that secure information is not exposed. SIVS 320 may manage resource requests from the UE 310, retrieve key information and generate visit IDs, transform and inverse transform images, and provide graphical user interface ("GUI") elements to UE 310 (e.g., for use in UI 175 or UI 210).

Public key repository 330 may include one or more devices (e.g., a server device or a distributed set of devices, such as a cloud computing system) that perform one or more actions described herein. For example, public key repository 330 may store information regarding public keys associated with one or more web resources. Public key repository 330 may store, for a given web resource 340, public keys collected via resource requests, web crawling, or other appropriate collection features. In addition to the collected public keys, public key repository 330 may store public key information such as a confidence level, a timestamp indicating a most recent update or verification of a stored key, and/or other appropriate parameters. Public key repository 330 may be, or may include, databases or other internal systems (e.g., systems that are not accessible outside UE 310, or without approval from a user associated with UE 310). In some embodiments, public key repository 330 may be, or may include, public website, services, or other external systems.

Web resources 340 may include one or more devices (e.g., a server device or a distributed set of devices, such as a cloud computing system) that provide or facilitate operation of various applications, browser content, etc. that may be provided to UE 310 via network 350. Each of the web resources 340 may be associated with a public key, which may be stored in public key repository 330.

Network 350 may include one or more radio access networks ("RANs"), via which UEs 310 may access one or more other networks or devices, a core network of a wireless telecommunications network, an IP-based packet data network ("PDN"), a wide area network ("WAN") such as the Internet, a private enterprise network, and/or one or more other networks. In some implementations, network 350 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 310 may connect to, and/or otherwise communicate with, via network 350, data servers, application servers, other UEs 310, etc. Network 350 may be connected to, and/or otherwise in communication with, one or more other networks, such as a public switched telephone network ("PSTN"), a public land mobile network ("PLMN"), and/or another network.

Figure 4:
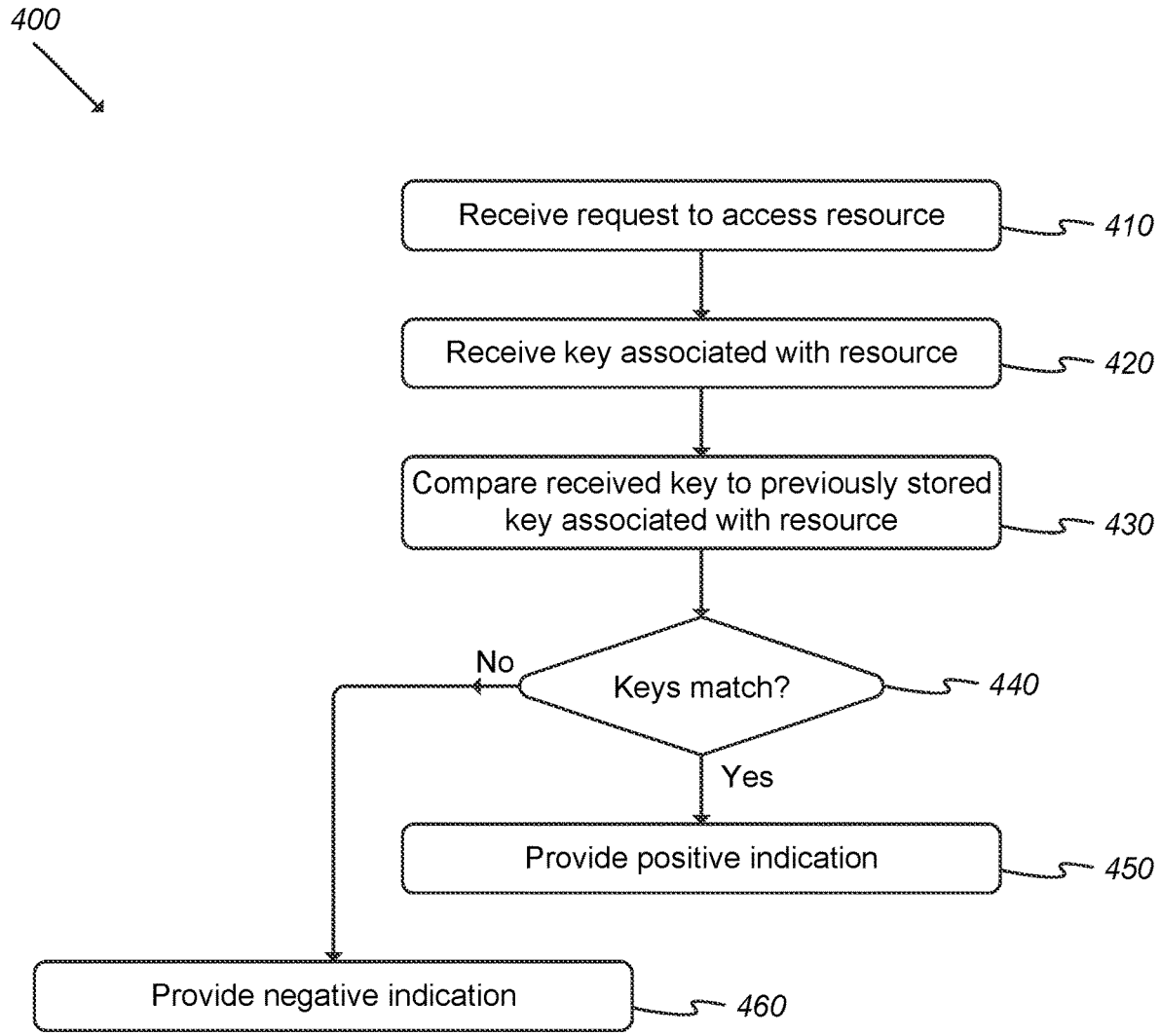
FIG. 4 illustrates an example process by which public keys for web resources may be evaluated and a security indication provided.

FIG. 4 illustrates an example process 400 for evaluating public keys and providing a security indication. In some embodiments, process 400 may be performed by SIVS 320. In some embodiments, process 400 may be performed by one or more other devices in addition to, or in lieu of, SIVS 320.

As shown, process 400 may include receiving (at 410) a request to access a resource. For example, SIVS 320 may receive a request from UE 310. The request may be received at SIVS 320 via a plugin running on a browser of UE 310, via an API associated with SIVS 320, via a network component, and/or other appropriate ways. In some embodiments, the request may be processed by components of SIVS 320 implemented at the UE 310. Components of SIVS 320 may be implemented at a network component or other entity that processes such requests, such as switches, routers, gateways, servers, API-accessible storages, bridges, etc.

The request may include an identifier of requested resource 340 (e.g., a uniform resource locator ("URL"), an IP address, and/or some other identifier). The resource may be associated with various security protocols and/or algorithms (e.g., TLS and/or some other suitable technique) that may utilize public keys to verify the integrity or security of communications between UE 310 and the requested resource 340, as discussed above.

Process 400 may also include receiving (at 420) a public key associated with the requested resource (referred to herein as a "visit key"). As mentioned above, the request received from UE 310 (at 410) may include the public key associated with the resource, and/or SIVS 320 may receive (at 420) the public key from the resource 340 itself.

Process 400 may further include comparing (at 430) the visit key to a previously stored public key associated with the requested resource. The previously stored public key may be received by SIVS 320 from public key repository 330. The comparison may include various appropriate algorithms or criteria (e.g., absolute matching of all elements of the stored key to the visit key, matching a portion of the stored key to a portion of the visit key, etc.). For instance, the SIVS 320 may perform a logical exclusive OR operation between each bit of the stored key and each bit of the visit key, with each logical high output indicating a one-bit mismatch between the stored key and the visit key.

Process 400 may additionally include determining (at 440) whether the keys match and providing (at 450) a positive indication if the keys match and providing (at 460) a negative indication if the keys don't match. Such indications may include the indicators described above and/or other appropriate indicators (e.g., icons, text-based indicators, color-based indicators, audio indicators, etc.). Thus, if the matching criteria is satisfied, the original secure image may be displayed or some other positive indication such as a padlock icon, text indicator, etc. If the matching criteria is not satisfied, a distorted or filtered version of the secure image may be displayed, a text warning may be presented, and/or other appropriate warning indicators may be provided (e.g., audio indicators).

In some embodiments, if the visit key does not match the stored key, the stored key may be updated. For instance, if a threshold number of mismatches occurs across users or across user visits associated with a particular resource, the stored key may be updated to match a currently provided key.

Figure 5:
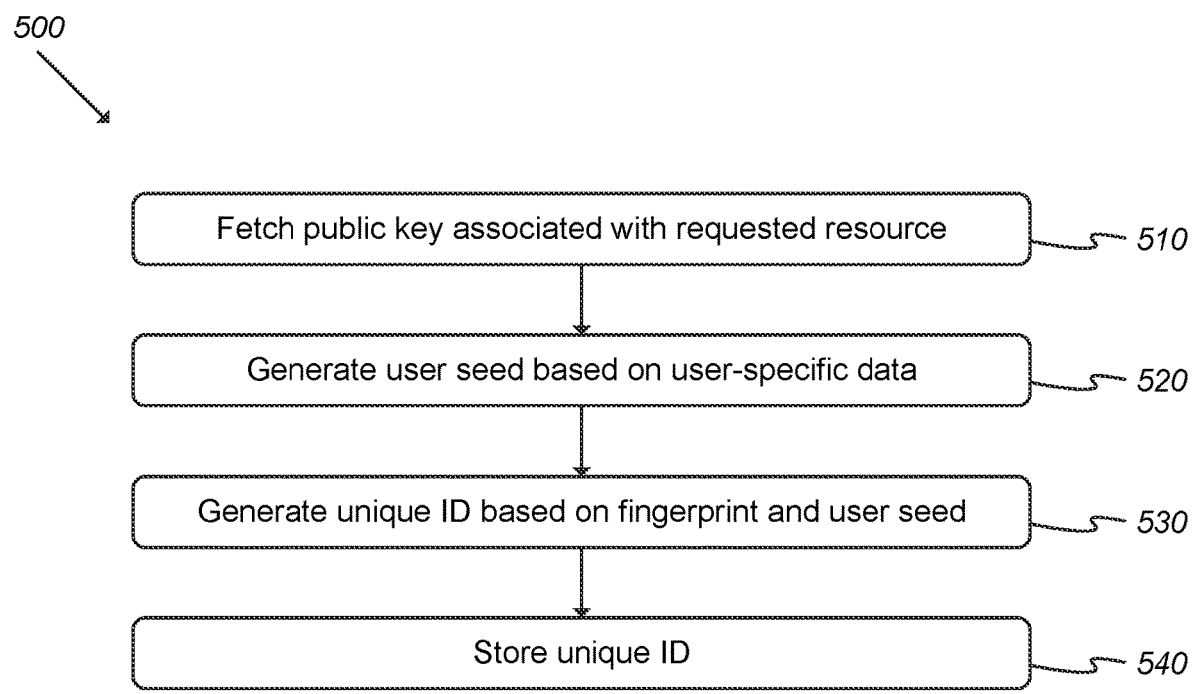
FIG. 5 illustrates an example process by which a unique ID associated with a user equipment ("UE") and/or web resource may be generated and stored.

FIG. 5 illustrates an example process 500 for generating and storing a unique ID. As described herein, a unique ID may be used to verify connection integrity and/or to transform secure images or other indicators. Process 500 may be performed as an initial setup process, when a previously generated unique ID expires, and/or under other appropriate circumstances (e.g., a user may initiate an update to an existing unique ID). In some embodiments, process 500 may be performed by SIVS 320. In some embodiments, process 500 may be performed by one or more other devices in addition to, or in lieu of, SIVS 320.

As shown, process 500 may include fetching (at 510) a public key associated with a requested resource. SIVS 320 may, for instance, retrieve the public key from web resource 340, and/or may receive the public key from UE 310. In some embodiments, SIVS 320 may calculate a fingerprint based on the public key. The fingerprint may be calculated using a set of cryptographic resources such as Secure Hash Algorithm 2 ("SHA-2") and/or using some other suitable technique.

Process 500 may further include generating (at 520) a user seed based on user-specific data. The user seed may be provided by the user via UE 310 to SIVS 320. The user seed may include (and/or may be derived from, or otherwise based on) a password, private passkey, biometric, and/or other information provided by the user. Example biometric data may include, for instance, scanned fingerprint information, captured images (e.g., facial features, retinal scan, etc.), captured audio (e.g., voice), and/or other biometric information. A hash (or other appropriate conversion) of the biometric information may be generated and applied to or included in the user seed.

Some embodiments may utilize device and/or user information to automatically generate a user seed (or portion thereof). Such device or user information may include user account information (e.g., username, user ID, etc.), UE information (e.g., serial number or other identifier associated with the device), application information, and/or other static information that may be used to regenerate the user seed during subsequent requests of the requested resource. The UE information may include a device "fingerprint" such as a hash of the MDN, IMSI, and/or IMEI, logical combinations of such elements, and/or other appropriate unique information. Such an approach may allow SIVS 320 to function across multiple UEs 310 associated with a single user, for instance, by utilizing user account information that is shared across the UEs.

The user seed may be associated with a single user accessing a specific resource 340 via a specific UE 310, with a specific user (or user account) accessing multiple resources 340 via a specific UE 310, a specific user accessing multiple resources 340 via multiple UEs 310, multiple users accessing multiple resources 340 via a specific UE 310, and/or other such usage scenarios.

Process 500 may additionally include generating (at 530) a unique ID based on the public key of the resource (e.g., the calculated fingerprint of the public key) and the user seed (e.g., the user-provided password, a fingerprint of an identifier of UE 310, etc.). Some embodiments may generate the unique ID by performing an exclusive OR between the user seed and the calculated fingerprint.

Process 500 may also include storing (at 540) the unique ID. The unique ID may be stored at the UE 310 such that it is not exposed to other resources. As described herein, the unique ID may be subsequently used to verify connection integrity by comparing the stored unique ID to subsequently generated visit IDs. In some embodiments, the unique ID may be used during transformation and inverse transformation of secure images such that a selected secure image is displayed when the visit ID matches the stored unique ID.

Figure 6:
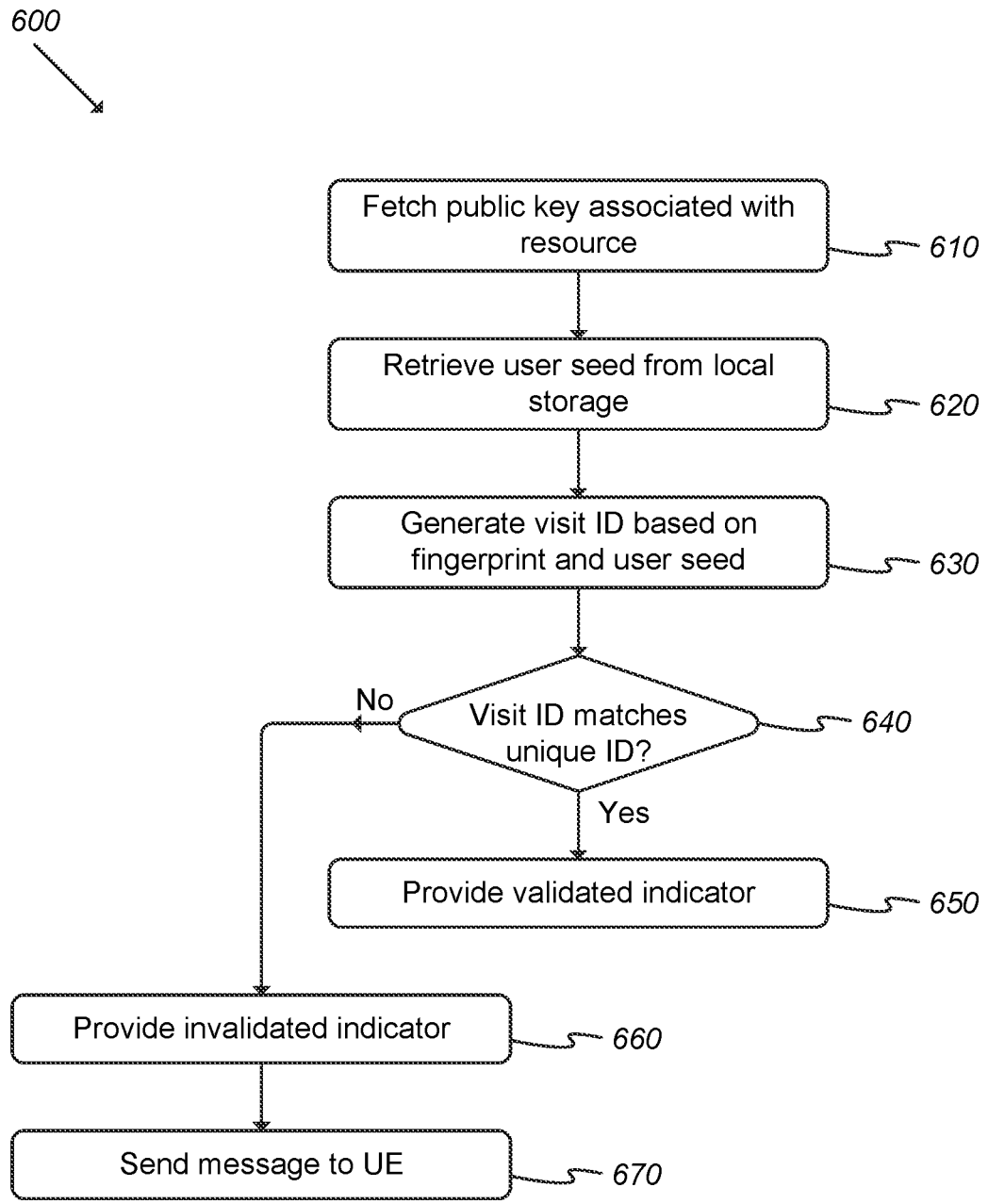
FIG. 6 illustrates an example process by which a visit ID associated with a UE and/or web resource may be validated against the unique ID.

FIG. 6 illustrates an example process 600 for validating a visit ID (e.g., based on a previously stored unique ID). Such validation (and indication) provides security for users by indicating that the public key (or other resource attribute) matches previously-supplied versions of the public key and that the user seed has been enter or generated correctly. In some embodiments, process 600 may be performed by SIVS 320. In some embodiments, process 600 may be performed by one or more other devices in addition to, or in lieu of, SIVS 320.

As shown, process 600 may include fetching (at 610) a public key associated with a resource. The public key may be associated with the web resource and/or the recipient UE. Such a public key may be fetched as part of a secure handshake or other access procedure initiated if a link is selected, a button pressed, a web address entered, search terms entered, and/or other appropriate circumstances. The public key may be retrieved by SIVS 320 from web resource 340 or UE 310. Some embodiments may calculate a fingerprint based on the public key. As above, the fingerprint may be calculated using a set of cryptographic resources such as SHA-2.

Process 600 may also include retrieving (at 620) the user seed. The seed may be retrieved from local storage at the UE 310. Alternatively, the user may be asked to re-enter the previously supplied user seed (e.g., by re-entering a password supplied during an initial visit). In some embodiments, the seed may be retrieved from cloud storage such as that associated with an online user account, thus allowing use across multiple UEs 310. As described above, the user seed may be automatically generated based on information associated with the user (e.g., username, account ID, etc.) or UE 310 (e.g., MDN, IMEI, IMSI, etc.).

Process 600 may additionally include generating (at 630) a visit ID based on the fingerprint and user seed. In some embodiments, SIVS 320 may generate the visit ID by performing an exclusive OR between the user seed and the calculated fingerprint.

Process 600 may determine (at 640) whether the visit ID matches the previously-stored unique ID. The determination may include comparing the visit ID to the stored unique ID, where the comparison may include various appropriate algorithms or criteria (e.g., absolute matching of all elements of the stored unique ID to the visit ID, matching a portion of the stored unique ID to a portion of the visit ID, etc.). For instance, the SIVS 320 may perform a logical exclusive OR operation between each bit of the stored unique ID and each bit of the visit ID, with each logical high output indicating a one-bit mismatch between the stored unique ID and the visit ID.

If the visit ID matches the stored unique ID, process 600 may include providing (at 650) a validated indicator. As mentioned above, a validated indicator may be a secure image that was previously selected by a user of UE 310. Alternatively, the validated indicator may include an icon, a text-based indicator (e.g., text such as "secure connection"), a color-based indicator (e.g., a green dot), etc. Such indicators may be provided as part of a web page UI (e.g., overlaid onto the page content, included in an address bar of the browser, included in a toolbar, provided as an icon or badge within an application, etc.).

If the visit ID does not match the stored unique ID, the process may provide (at 660) an invalidated indicator, where the invalidated indicator may be an image that differs from the secure image initially selected by a user. Alternatively, the invalidated indicator may include an icon, text-based indicator, color-based indicator, etc. Process 600 may include sending (at 670) a message or notification (e.g., an email, popup, text, voice, etc.) to UE 310 when the visit ID does not match the stored unique ID.

Figure 7:
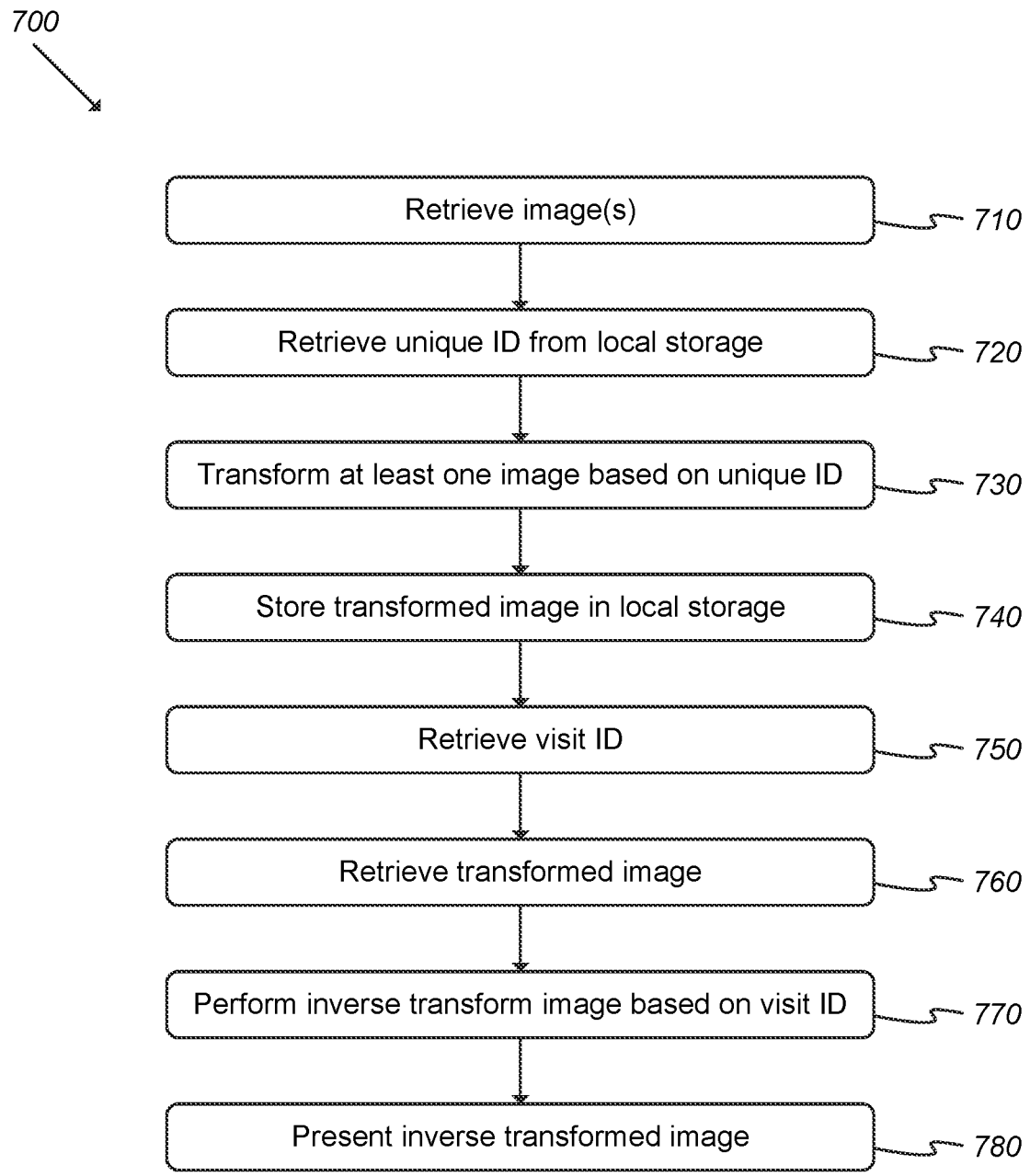
FIG. 7 illustrates an example process by which a secure image may be transformed and stored.

FIG. 7 illustrates an example process 700 for transforming and storing a secure image. Such a process may utilize the stored unique ID to transform a selected secure image such that a complementary inverse transformation using a matching unique ID will provide the selected secure image and thus verify connection integrity. In some embodiments, process 700 may be performed by SIVS 320. In some embodiments, process 700 may be performed by one or more other devices in addition to, or in lieu of, SIVS 320.

As shown, process 700 may include retrieving (at 710) at least one image. The SIVS 320 may retrieve the image(s) from a resource such as a local storage, the UE 310, a web resource 340 (which may include the requested resource), and/or other appropriate media sources. The image may be selected by and/or presented to a user as part of an initial security setup process or subsequent renewal process.

Process 700 may further include retrieving (at 720) a unique ID. The unique ID may have been previously generated (e.g., using a process such as a process 500), and may be unique with respect to UE 310 and/or a user associated with UE 310.

The process may additionally include transforming (at 730) the retrieved at least one image based on the unique ID. The image transformation may include manipulating various properties of the image based on the unique ID. Such manipulation may depend on the features of the selected image(s). For instance, some images may include one or more sets of feature points such that features of the image may be manipulated (e.g., a smile may be changed to a frown during transformation). Some embodiments may feed the unique ID and the selected image(s) into an image filter in order to generate a unique output image. In some embodiments, the transformation may include selecting a single image from a set of available images, based on the unique ID.

Some embodiments may generate an image based on the unique ID. Such images may be generated using various animation or automated image generation techniques. For instance, the unique ID may be used to generate various sets of vector coordinates that may be used to define image elements and/or attributes of those elements (e.g., colors, textures, etc.).

Process 700 may also include storing (at 740) the transformed image. The transformed image may be associated with various transformation parameters (e.g., algorithm type, transform coefficients, etc.) and complementary inverse transformation parameters. The inverse transformation parameters may allow SIVS 320 to utilize a matching visit ID (i.e., a visit ID that matches the stored unique ID) to perform an inverse transformation such that a selected secure image is generated based on the stored transformed image. Such transformation and/or inverse transformation parameters may be embedded into the transformed image and/or otherwise associated with the stored image.

As shown, process 700 may include generating or retrieving (at 750) a visit ID. The visit ID may be generated or retrieved if the UE requests a resource associated with the previously stored unique ID (e.g., when a link is selected, a URL entered, etc.). The visit ID may be generated and/or retrieved in a manner similar to described above with regard to process 600.

Process 700 may further include retrieving (at 760) the transformed image stored at 740. The transformed image may be retrieved from a resource such as a transformed image repository, which may be stored locally to UE 310 and/or SIVS 320. The transformed image may be associated with a particular user, UE, web resource, and/or some combination of elements thereof.

Process 700 may also include performing (at 770) an inverse transform of the transformed image based on the visit ID. The inverse transformation may be performed using a complementary transformation algorithm and/or a complementary set of transformation parameters to those used when transforming the image in process 700. If the visit ID matches the previously stored unique ID, the inverse transformed image will match the originally selected secure image.

If, on the other hand, the visit ID does not match the previously stored unique ID, the image will be somehow different, deformed, have one or more wrong colors, include the wrong image or elements, etc. in a manner that makes the user aware that the connection is not secure. Such an image-based notification provides an easily perceived indication to the user without requiring the user to have knowledge of elements such as the public key, user seed (if automatically generated), or even the concept of a man-in-the-middle attack itself.

Process 700 may additionally include providing (at 780) the image. The image may be displayed as part of a UI, such as area 230 of UI 200. As described above, the image may be overlaid onto the web page content, may be included in an address bar or toolbar, or may be otherwise prominently displayed such that a user is easily able to perceive the indicator and understand whether the connection has been successfully validated or invalidated.

Figure 8:
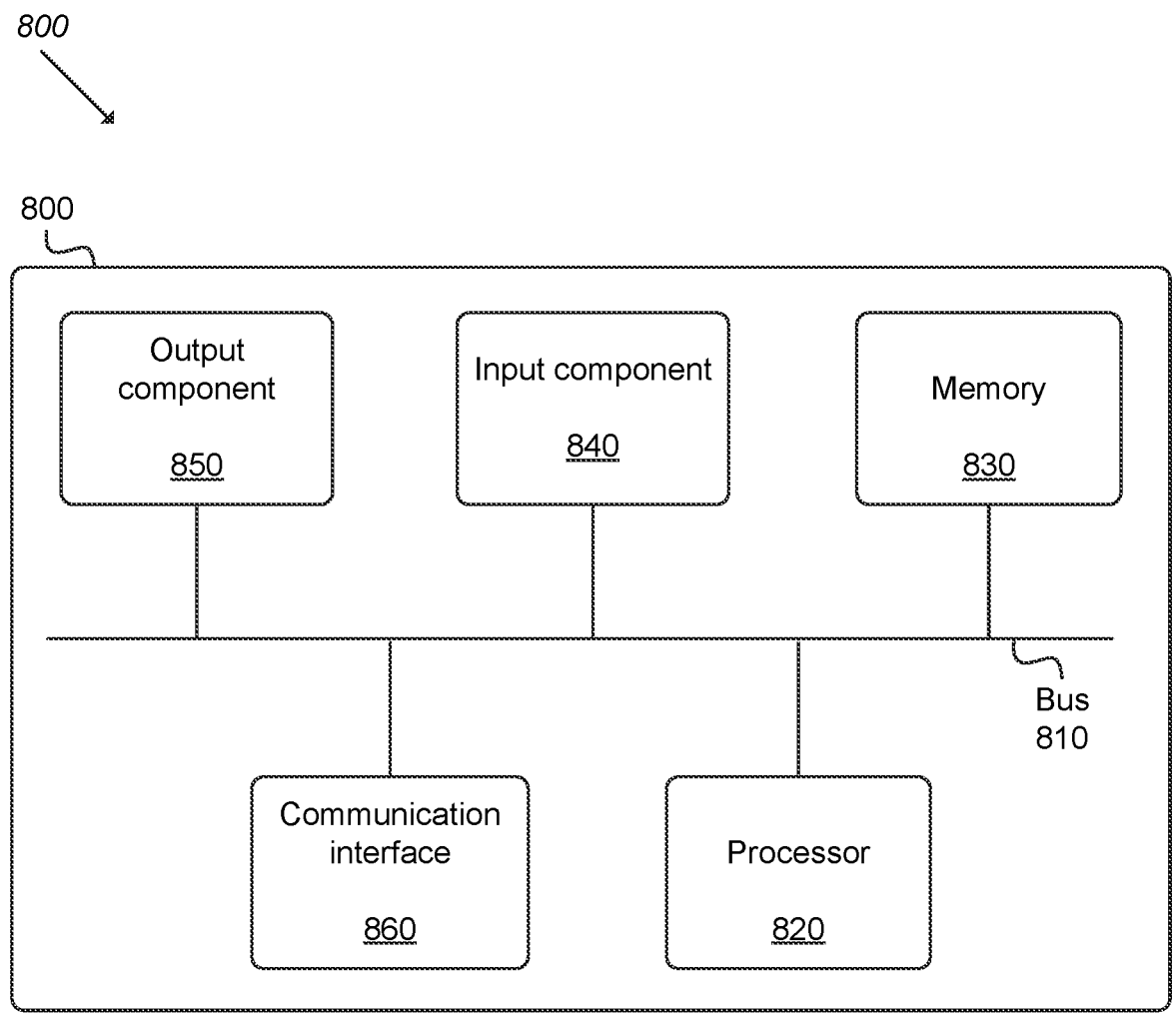
FIG. 8 illustrates example components of one or more devices, according to one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4-7, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
generate a first transformed image by transforming a particular image based on:
a first value associated with a particular resource, and
a second value associated with a particular User Equipment ("UE");
receive a request from the particular UE to access the particular resource, the request including a third value;
identify, based on receiving the request, a fourth value associated with the particular resource;
generate a second transformed image by transforming the first transformed image based on:
the third value included in the request, and
the fourth value retrieved based on receiving the request; and
provide the generated second transformed image to the UE based on the request.

2. The device of claim 1, wherein the second transformed image matches the particular image when the second value matches the fourth value.

3. The device of claim 2, wherein the second transformed image matches the particular image when the first value matches the third value.

4. The device of claim 1, wherein the one or more processors are further configured to:
retrieve the first value prior to receiving the request from the particular UE to access the particular resource,
wherein identifying the fourth value includes:
retrieving the fourth value after receiving the request from the particular UE to access the particular resource.

5. The device of claim 1, wherein the first value includes a public key associated with the particular resource.

6. The device of claim 1, wherein the second value is based on a first authentication procedure performed by the UE, and wherein the fourth value is based on a second authentication procedure performed by the UE.

7. The device of claim 1, wherein the second transformed image does not match the particular image when at least one of:
the first value does not match the third value, or
the second value does not match the fourth value.

8. A non-transitory computer-readable medium, storing a plurality of processor-executable instructions to:
generate a first transformed image by transforming a particular image based on:
a first value associated with a particular resource, and
a second value associated with a particular User Equipment ("UE");
receive a request from the particular UE to access the particular resource, the request including a third value;
identify, based on receiving the request, a fourth value associated with the particular resource;
generate a second transformed image by transforming the first transformed image based on:
the third value included in the request, and
the fourth value retrieved based on receiving the request; and
provide the generated second transformed image to the UE based on the request.

9. The non-transitory computer-readable medium of claim 8, wherein the second transformed image matches the particular image when the second value matches the fourth value.

10. The non-transitory computer-readable medium of claim 8, wherein the second transformed image matches the particular image when the first value matches the third value.

11. The non-transitory computer-readable medium of claim 8, wherein the plurality of processor-executable instructions further include processor-executable instructions to:
retrieve the first value prior to receiving the request from the particular UE to access the particular resource,
wherein identifying the fourth value includes:
retrieving the fourth value after receiving the request from the particular UE to access the particular resource.

12. The non-transitory computer-readable medium of claim 8, wherein the first value includes a public key associated with the particular resource.

13. The non-transitory computer-readable medium of claim 8, wherein the second value is based on a first authentication procedure performed by the UE, and wherein the fourth value is based on a second authentication procedure performed by the UE.

14. The non-transitory computer-readable medium of claim 8, wherein the second transformed image does not match the particular image when at least one of:
the first value does not match the third value, or
the second value does not match the fourth value.

15. A method, comprising:
generating a first transformed image by transforming a particular image based on:
a first value associated with a particular resource, and
a second value associated with a particular User Equipment ("UE");
receiving a request from the particular UE to access the particular resource, the request including a third value;
identifying, based on receiving the request, a fourth value associated with the particular resource;
generating a second transformed image by transforming the first transformed image based on:
the third value included in the request, and
the fourth value retrieved based on receiving the request; and
providing the generated second transformed image to the UE based on the request.

16. The method of claim 15, wherein the second transformed image matches the particular image when:
the first value matches the third value, and
the second value matches the fourth value.

17. The method of claim 15, further comprising:
retrieving the first value prior to receiving the request from the particular UE to access the particular resource,
wherein identifying the fourth value includes:
retrieving the fourth value after receiving the request from the particular UE to access the particular resource.

18. The method of claim 15, wherein the first value includes a public key associated with the particular resource.

19. The method of claim 15, wherein the second value is based on a first authentication procedure performed by the UE, and wherein the fourth value is based on a second authentication procedure performed by the UE.

20. The method of claim 15, wherein the second transformed image does not match the particular image when at least one of:
   the first value does not match the third value, or
   the second value does not match the fourth value.

* * * * *